United States Patent
Nakao et al.

(10) Patent No.: US 7,535,585 B2
(45) Date of Patent: May 19, 2009

(54) COMPUTER PROGRAM PRODUCT EXECUTED IN SERVER COMPUTER CONNECTED TO PRINTER AND CLIENT COMPUTER, AND PRINTER FUNCTION DESCRIPTION FILE EDITING METHOD

(75) Inventors: Shuji Nakao, Kobe (JP); Yukinori Matsumoto, Amagasaki (JP); Yoshinori Sugahara, Kyoto (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 1164 days.

(21) Appl. No.: 10/385,704

(22) Filed: Mar. 12, 2003

(65) Prior Publication Data

US 2004/0109196 A1    Jun. 10, 2004

(30) Foreign Application Priority Data

Dec. 9, 2002    (JP)    ............................. 2002-356798

(51) Int. Cl.
  *G06F 15/00* (2006.01)
  *G06F 3/12* (2006.01)
  *G06F 13/10* (2006.01)
(52) U.S. Cl. .................. 358/1.13; 358/1.15; 719/328
(58) Field of Classification Search ........... 358/1.1–1.9, 358/1.13–1.18, 1.12; 709/203, 218; 400/76; 719/328; 710/10; 235/478.01
  See application file for complete search history.

(56) References Cited

U.S. PATENT DOCUMENTS 5,727,135 A    3/1998    Webb et al.
6,301,012 B1 *    10/2001    White et al. ................ 358/1.15
6,321,992 B1 *    11/2001    Knowles et al. ........ 235/462.01
6,490,052 B1 *    12/2002    Yanagidaira ................ 358/1.15
6,567,180 B1 *    5/2003    Kageyama et al. ......... 358/1.15
7,054,015 B1 *    5/2006    Ganji ......................... 358/1.13
7,148,989 B2 *    12/2006    Hitaka ........................ 358/1.16
2001/0046066 A1 *    11/2001    Ueda et al. ................. 358/1.15
2003/0020939 A1 *    1/2003    Sugahara ................... 358/1.13
2006/0033947 A1 *    2/2006    Kadota ....................... 358/1.14

FOREIGN PATENT DOCUMENTS

JP    03-029019 A    2/1991

(Continued)

OTHER PUBLICATIONS

Notice of Grounds of Rejection in JP 2002-356798 dated Oct. 7, 2008, and a English Translation thereof.

(Continued)

*Primary Examiner*—King Y Poon
*Assistant Examiner*—Allen H Nguyen
(74) *Attorney, Agent, or Firm*—Buchanan Ingersoll & Rooney PC (57) ABSTRACT

In order to facilitate setting of a printer's function, a computer program product executed in a server computer connected to a printer and a client computer includes computer instructions for transmitting an HTML file to the client computer, wherein the HTML file is used for displaying a screen on the client computer for prompting to input characters, and editing a printer function description file, in which a function of the printer is described, based on the characters inputted on the client computer when the inputted characters are transmitted from the client computer.

24 Claims, 11 Drawing Sheets

FOREIGN PATENT DOCUMENTS

| | | |
|---|---|---|
| JP | 10-136142 | 5/1998 |
| JP | 11-031042 | 2/1999 |
| JP | 11219268 | 8/1999 |
| JP | 11219269 | 8/1999 |
| JP | 11-316658 | 11/1999 |
| JP | 11-338662 | 12/1999 |
| JP | 2000099286 | 4/2000 |
| JP | 2000-207475 | 7/2000 |
| JP | 2001-195218 | 7/2001 |
| JP | 2001-236196 A | 8/2001 |
| JP | 2002-333967 | 11/2002 |

OTHER PUBLICATIONS

Japanese Office Action dated Jun. 27, 2006, with English-language translation.

* cited by examiner

```
*% ================================================
*% Printer Description File
------ (MIDDLE OMITTED) ----------
*% ================================================
*% Account Code definitions
*% ================================================

*OpenUI *JCLAccountCode/Account Code: PickOne
*OrderDependency: 20 JCLSetup *JCLAccountCode
*DefaultJCLAccountCode: Off
*JCLAccountCode Off/Off:   ""
*JCLAccountCode Code1/0000: "@PJL SET GROUPCODE = <22>0000<220A>"
*CloseUI: *JCLAccountCode

*% ================================================
------ (MIDDLE OMITTED) ----------
*% ================================================
*% Password definitions
*% ================================================
*OpenUI *JCLPassword/Password: PickOne
*OrderDependency: 20 JCLSetup *JCLPassword
*DefaultJCLPassword: Off
*JCLPassword Off/Off:   ""
*JCLPassword Code1/******: "@PJL SET HOLDKEY = <22>******<220A>"
*CloseUI: *JCLPassword

*% ================================================
*% Default User Name definitions
*% ================================================
*OpenUI *JCLUserName/Default User Name: PickOne
*OrderDependency: 20 JCLSetup *JCLUserName
*DefaultJCLUserName: Off
*JCLUserName Off/Off:   ""
*JCLUserName1/:none "@PJL SET CHARGENAME = <22>none<220A>"
*CloseUI: *JCLUserName

*% ================================================
*% Overlay Form definitions
*% ================================================
*OpenUI *JCLOverlay/Overlay Form: PickOne
*OrderDependency: 20 JCLSetup *JCLOverlay
*DefaultJCLOverlay: Off
*JCLOverlay Off/Off:   ""
*JCLOverlay Overlay1/NO FORM: "@PJL SET OVERLAYFILE = <22>NO FORM<220A>"
*CloseUI: *JCLOverlay
```

```
*% ================================================
*% Printer Description File
------ (MIDDLE OMITTED) ----------
*% ================================================
*% Account Code definitions
*% ================================================

*OpenUI *JCLAccountCode/Account Code: PickOne
*OrderDependency: 20 JCLSetup *JCLAccountCode
*DefaultJCLAccountCode: Off
*JCLAccountCode Off/Off:   ""
*JCLAccountCode Code1/3260: "@PJL SET GROUPCODE = <22>3260<220A>"
*JCLAccountCode Code2/4480: "@PJL SET GROUPCODE = <22>4480<220A>"
*JCLAccountCode Code3/1100: "@PJL SET GROUPCODE = <22>1100<220A>"
*CloseUI: *JCLAccountCode
------ (MIDDLE OMITTED) ----------
*% ================================================
*% Password definitions
*% ================================================

*OpenUI *JCLPassword/Password: PickOne
*OrderDependency: 20 JCLSetup *JCLPassword
*DefaultJCLPassword: Off
*JCLPassword Off/Off:   ""
*JCLPassword Code1/1234: "@PJL SET HOLDKEY = <22>1234<220A>"
*JCLPassword Code2/2020: "@PJL SET HOLDKEY = <22>2020<220A>"
*JCLPassword Code3/5533: "@PJL SET HOLDKEY = <22>5533<220A>"
*CloseUI: *JCLPassword

*% ================================================
*% Default User Name definitions
*% ================================================

*OpenUI *JCLUserName/Default User Name: PickOne
*OrderDependency: 20 JCLSetup *JCLUserName
*DefaultJCLUserName: Off
*JCLUserName Off/Off:   ""
*JCLUserName1/:nakao "@PJL SET CHARGENAME = <22>nakao<220A>"
*CloseUI: *JCLUserName

*% ================================================
*% Overlay Form definitions
*% ================================================

*OpenUI *JCLOverlay/Overlay Form: PickOne
*OrderDependency: 20 JCLSetup *JCLOverlay
*DefaultJCLOverlay: Off
*JCLOverlay Off/Off:  ""
*JCLOverlay Overlay1/FORM1: "@PJL SET OVERLAYFILE = <22>FORM1<220A>"
*JCLOverlay Overlay2/FORM2: "@PJL SET OVERLAYFILE = <22>FORM2<220A>"
*JCLOverlay Overlay3/FORM3: "@PJL SET OVERLAYFILE = <22>FORM3<220A>"
*JCLOverlay Overlay4/FORM4: "@PJL SET OVERLAYFILE = <22>FORM4<220A>"
*JCLOverlay Overlay5/FORM5: "@PJL SET OVERLAYFILE = <22>FORM5<220A>"
*CloseUI: *JCLOverlay
```

COMPUTER PROGRAM PRODUCT EXECUTED IN SERVER COMPUTER CONNECTED TO PRINTER AND CLIENT COMPUTER, AND PRINTER FUNCTION DESCRIPTION FILE EDITING METHOD

This application is based on Japanese Patent Application No. 2002-356798, the entire content of which is hereby incorporated by reference.

BACKGROUND OF THE INVENTION

1. Field of the Invention

The present invention relates to a computer program product executed in a server computer connected to a printer and a client computer, and a printer function description file editing method.

2. Description of the Related Art

Conventionally, a printer is connected to a computer directly or indirectly via a network or the like. Print data transmitted from the computer is received at the printer to be output onto a record medium such as a paper sheet. During this operation, the computer determines the printer's function based on the printer information defined in a file where the feature of that printer is written (referred to as "the printer function description file" hereinafter). Therefore, the printer information defined in the printer function description file must match the function of the printer.

For the purpose of reflecting any change made in the function of a printer into the definition of the printer function description file, there is known a system that transmits, in response to an inquiry from the computer, the printer function description file stored in the printer to the computer.

When the function of the printer is changed in the conventional system, the change is reflected in the definition of the printer function description file. Therefore, information to alter the definition in the printer function description file has been generated on the part of the printer. The printer function description file can also define information unique to the user. This unique information includes, for example, an account code, a password, a user name, and an overlay form. Therefore, the unique information cannot be altered from the personal computer side in the above-described conventional system.

In these days where the network has evolved significantly, most usage applications have one printer shared by a plurality of computers. There is only one printer function description file in such usage application. Therefore, the unique information for all users must be defined in the one printer function description file. This means that, in the option menu displayed to select a function of the printer, unique information of another user irrelevant to the present user will be displayed. An increase in the number of options is disadvantageous in that prompt selection on the user side is impeded. There is also a problem that a password may be disclosed to an irrelevant person.

SUMMARY OF THE INVENTION

In view of the foregoing, an object of the present invention is to provide a computer program product that allows a client computer connected through a network to set the function of the printer.

Another object of the present invention is to provide a computer program product that facilitates setting of the function of a printer.

A further object of the present invention is to provide a printer function description file editing method that allows the function of a printer to be readily set by a client.

According to an aspect of the present invention, a computer program product executed in a server computer connected to a printer and a client computer includes computer instructions for transmitting data to the client computer, wherein the data is used for displaying a screen on the client computer for prompting to input characters, and editing a printer function description file, in which a function of the printer is described, based on the characters inputted on the client computer when the inputted characters are transmitted from the client computer.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3 and 4 show examples of a PPD file.

DESCRIPTION OF THE PREFERRED EMBODIMENTS

Embodiments of the present invention will be described hereinafter with reference to the drawings. In the following, the same elements have the same reference characters allotted. Their label and function are identical. Therefore, detailed description thereof will not be repeated.

First Embodiment

Figure 1A:
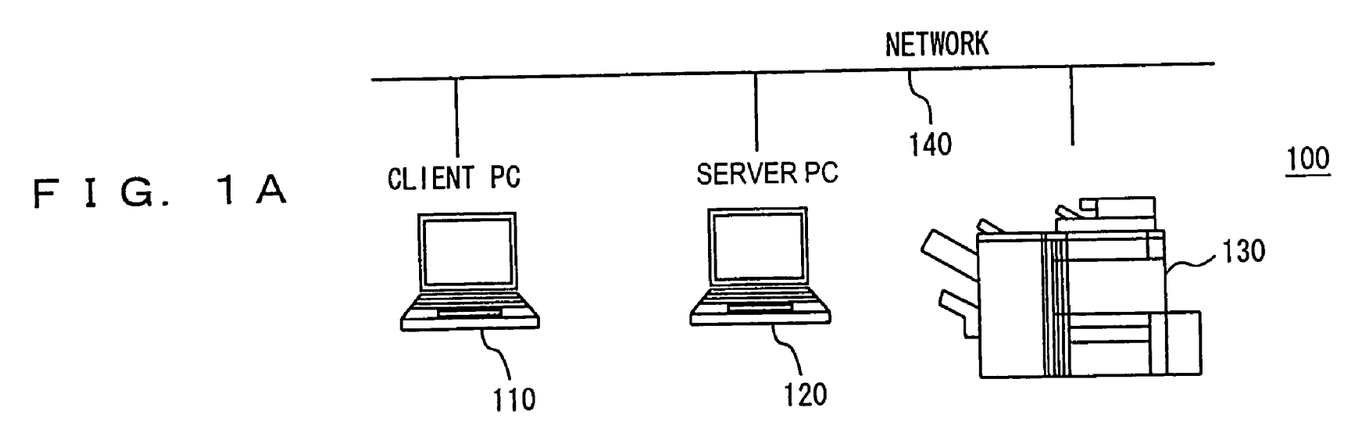
FIGS. 1A and 1B show examples of a hardware configuration of a printer system according to a first embodiment of the present invention.
Figure 1B:
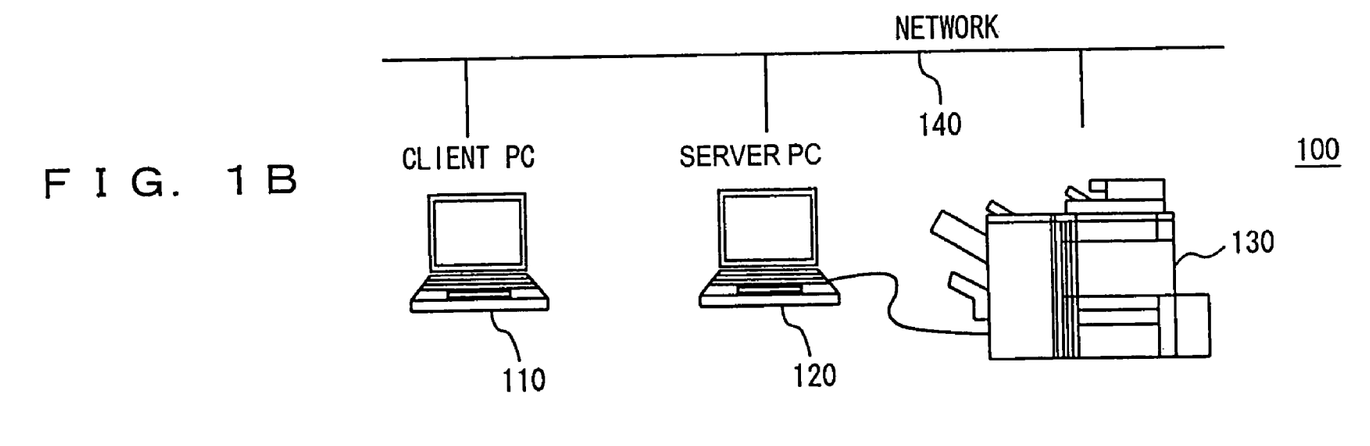

FIGS. 1A and 1B show examples of a hardware configuration of a printer system according to a first embodiment of the present invention. A printer system 100 of the present embodiment includes a personal computer corresponding to a client (referred to as "client PC" hereinafter) 110, a personal computer corresponding to a server (referred to as "server PC" hereinafter) 120, and a printer 130. Printer 130 may be a multifunction product (MFP) used both as a facsimile and a copy machine.

Referring to FIG. 1A, client PC 110, server PC 120 and printer 130 are respectively connected to a network 140. In printer system 100 of the present hardware configuration, there is the case where the print data output from client PC 110 is transmitted to printer 130 via server PC 120 and the case where the print data is directly transmitted to printer 130 without passing through server PC 120. In other words, the case differs depending upon whether printer 130 is controlled by respective client PC 110, or controlled together at server PC 120.

In the hardware configuration of FIG. 1B, client PC 110 and server PC 120 are connected to network 140, and the printer is connected locally to server PC 120. In the printer system of this hardware configuration, print data output from client PC 110 is transmitted to printer 130 via server PC 120. Therefore, printer 130 is under control of server PC 120.

Printer system 100 of the present embodiment may take either of the different hardware configurations of FIGS. 1A and 1B. In the printer system according to the hardware configuration of FIG. 1A, printer 130 is under the control of either client PC 110 or server PC 120. Printer system 100 of the present embodiment allows either control. The description set forth below is based on the case where the hardware configuration of FIG. 1A is employed and printer 130 is under the control of server PC 120, unless stated otherwise.

Each of client PC 110 and server PC 120 is a general personal computer, including a central processing unit (CPU), a semiconductor memory such as a read only memory (ROM) and a random access memory (RAM), and a storage device such as a hard disk. Each of client PC 110 and server PC 120 is connected to a display such as a liquid crystal display or cathode ray tube (CRT), an input device such as a mouse and keyboard, and an external storage device such as a CD-ROM (Compact Disc-Read Only Memory) drive and an FD (Flexible Disk) drive. The hardware per se of the computer is a general one. Since the operation of a computer per se is well known, detailed description thereof will not be repeated here.

Although only one client PC 110 is depicted in FIGS. 1A and 1B, a plurality of client PCs are connected to network 140. Therefore, the print data output from a plurality of client PCs can be printed out through printer 130. In this sense, printer 130 is shared by a plurality of client PCs.

Furthermore, although only one printer 130 is indicated, a plurality of printers can be connected to network 140. In this case, client PC 110 can select a plurality of printers for output by switching the printer driver.

Server PC 120 is stored with a printer driver program to control printer 130, and a printer function description file of printer 130. The printer function description file is preferably a PPD (Postscript (R) printer Description) file. The printer driver program, after being installed in a computer, is the software to control the printer whose function is altered by selecting a displayed option. Preferably, the printer driver program is a Postscript (R) printer driver program.

Printer 130 is a Postscript (R) printer controlled by execution of a printer driver program at a client PC 110 where the printer driver program and the printer function description file (PPD file) are installed.

In printer system 100 of the present embodiment, the printer driver must be installed in advance in client PC 110 for the purpose of transmitting print data from client PC 110 to printer 130 to be printed out. This install procedure of the printer driver includes the steps of downloading the printer driver program and PPD file of printer 130 stored in server PC 120, and installing using the downloaded printer driver program and PPD file. This install step will be described in detail afterwards.

By storing the printer driver and PPD file in server PC 120 that are to be used for installation in client PC 110, any change in the printer driver and change in the function of printer 130 can be reflected by altering the printer driver program or PPD file stored in server PC 120 and executing installation again at each client PC 110. Thus, superior maintenance can be achieved.

The PPD file defines functions common to a plurality of users such as the printing resolution and smoothing process, as well as a function achieved using information unique to a user. The function achieved using information unique to the user includes, for example, the function to count the number of copies for each group (for example, a division) identified by an account code (referred to as "division administration function" hereinafter), the function to print out print data assigned with a personal code under the condition that the personal code is entered to the printer (referred to as "personal code function" hereinafter), the function to print out print data assigned with a user's name with the user's name combined (referred to as "user name adding function" hereinafter), the function to combine print data, when a particular overlay format is specified, with that particular overlay format and print out the combined print data (referred to as "overlay function" hereinafter), and the like. The unique information for the division administration function, personal code function, user name adding function and overlay function is labeled "account code", "personal code", "user name", and "overlay form", respectively.

When the user of client PC 110 is to output print data, a print setting screen to specify these unique information is displayed by the installed print driver. The print setting screen provides the unique information in the form of options. The user selects and specifies any of the options of the unique information, whereby the specified unique information is transmitted to printer 130 with print data added by the printer driver. Printer 130 performs the process using the function achieved according to the specified unique information to print out the received print data.

FIGS. 2A, 2B, 2C and 2D show examples of a print setting screen output by the printer driver. As mentioned previously, this print setting screen is displayed at client PC 110 in which the printer driver is installed when the user provides print data to printer 130. In the present specification, the print setting screen is the property screen output by the printer driver.

Figure 2A:
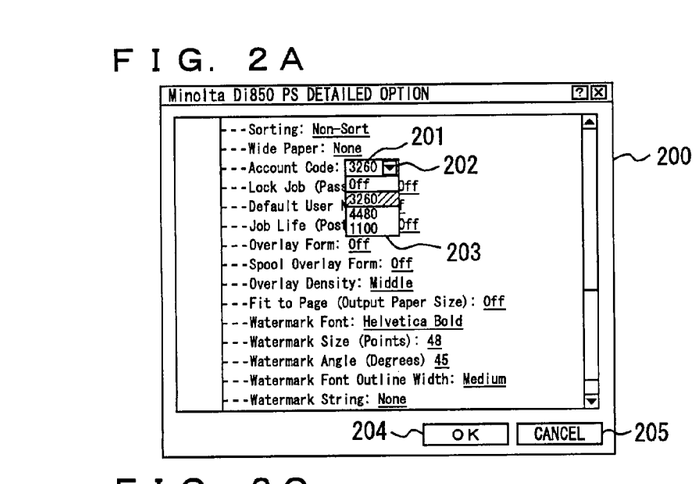
FIGS. 2A, 2B, 2C and 2D show examples of a print setting screen output from a printer driver.
Figure 2B:
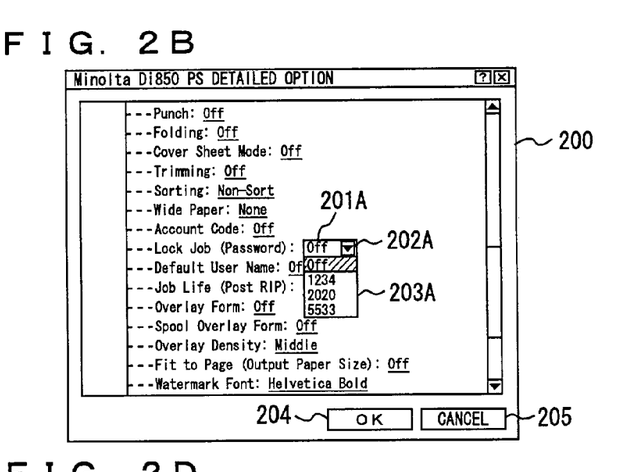
Figure 2C:
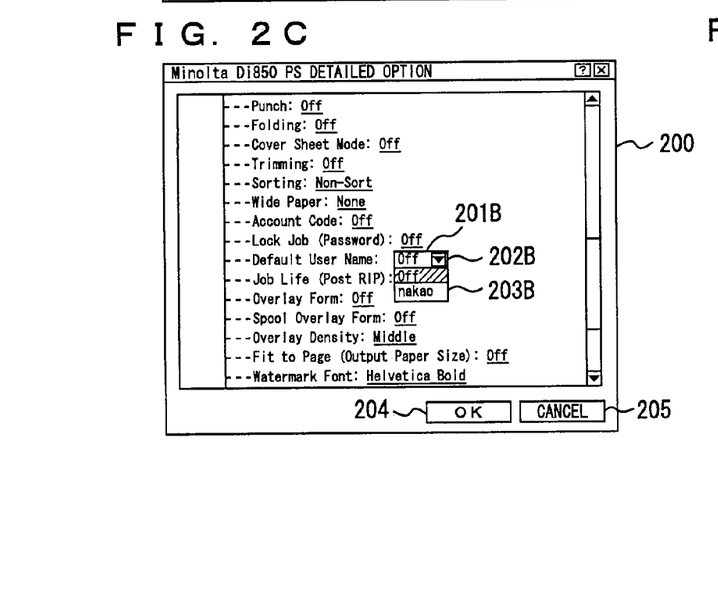
Figure 2D:
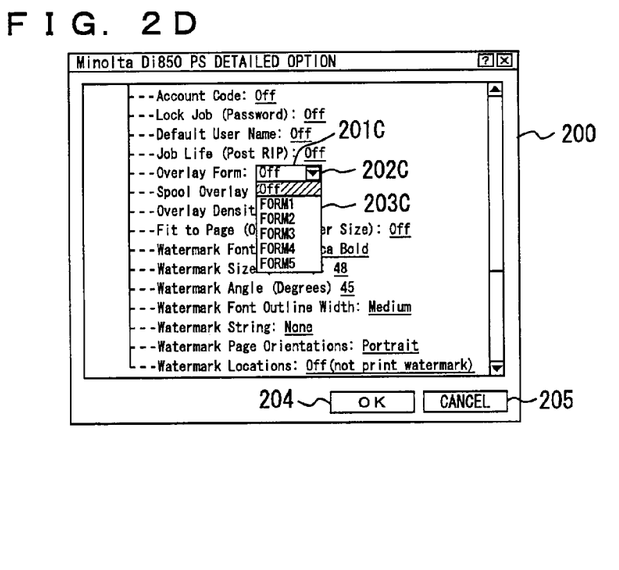

FIG. 2A shows a print setting screen corresponding to the state where the option of the account codes (Account code) is displayed. FIG. 2B shows a print setting screen corresponding to the state where the option of passwords (Lock Job (Password)) is displayed. FIG. 2C shows a print setting screen corresponding to the state where the option of user's names (Default User Name) is displayed. FIG. 2D shows a print setting screen corresponding to the state where the option of overlay forms (Overlay Form) is displayed. Referring to FIGS. 2A-2D, print setting screen 200 includes options 203, 203A, 203B and 203C to select an account code, a password, a user name, and an overlay form, respectively.

Display and selection of an option are executed by operations set forth below. The user operates the mouse to move the mouse pointer onto check buttons 202, 202A, 202B and 202C of sections 201, 201A, 201B and 201C, respectively, on the display, whereby options 203, 203A, 203B and 203C are displayed. For example, in print setting screen 200 of FIG. 2A, the options of "OFF", "3260", "4480" and "1100" are displayed as the option of account codes.

With options 203, 203A, 203B and 203C of the data to be set at sections 201, 201A, 201B and 201C displayed on print setting screen 200, the user operates the mouse to set the mouse pointer present on the display to any of the options, whereby the data of the selected option is displayed and set at the setting section. For example, on print setting screen 200 of FIG. 2A, "3260" appearing at option 203 of the account code is specified to be displayed in section 201 in a set state.

In printer system 100 of the present embodiment, a program to set the data of the options displayed on print setting screen 200 described with reference to FIGS. 2A-2D is executed by server PC 120. This will be described in detail.

Figure 3:
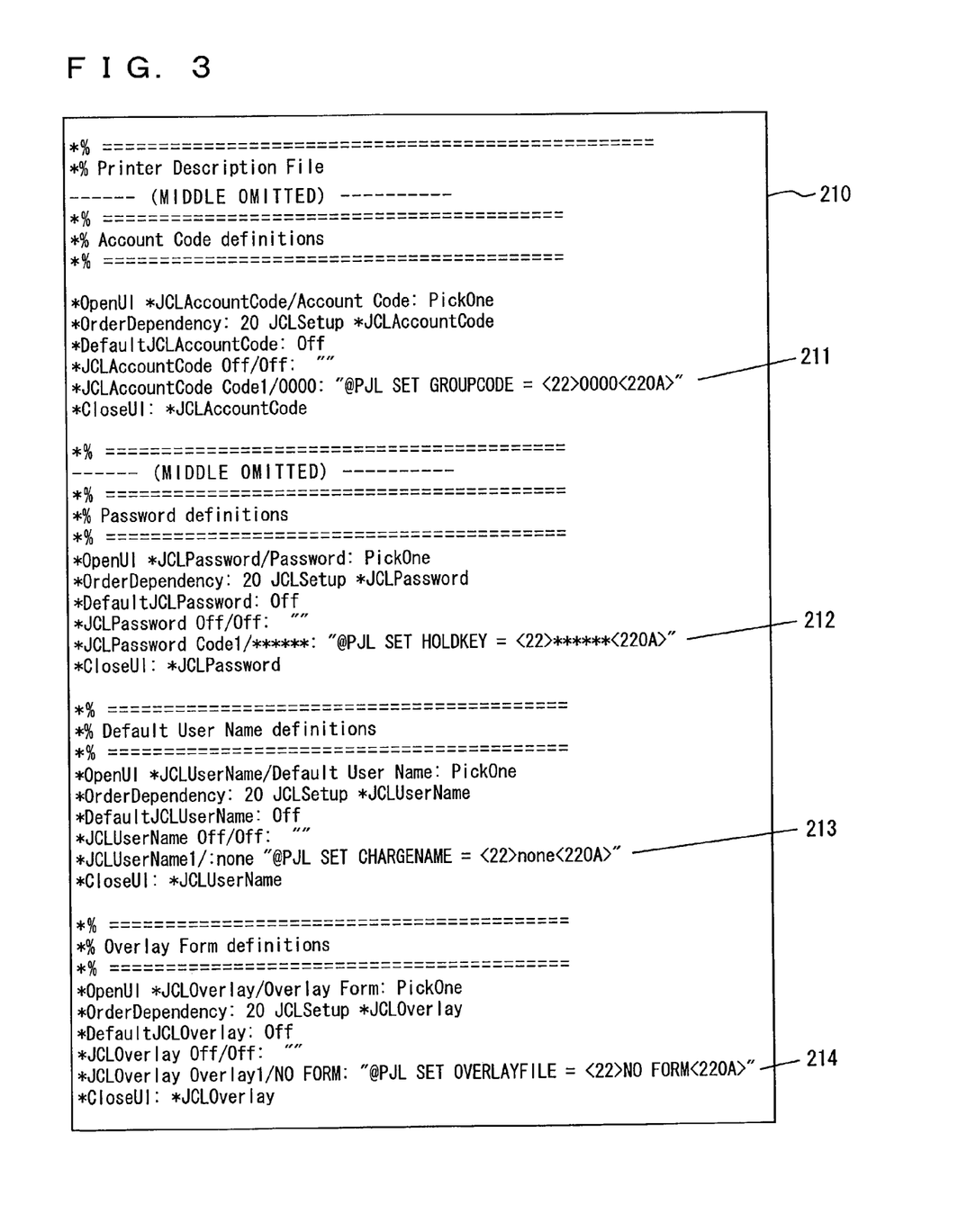

FIGS. 3 and 4 show an example of a PPD file. Print setting screen 200 shown in FIGS. 2A-2D is output based on the PPD file of FIG. 4. FIG. 3 corresponds to the state where the data of the options of the unique information is not yet edited. FIG. 4 corresponds to the state where the data of the options of the unique information has been edited. A region 211 of FIG. 3 is where information related to the account code is written. Based on the information written in this region 211, option 203 corresponding to set section 201 of the account code in print setting screen 200 is displayed. After the data of the option of the unique information is edited, information is written into region 211 of FIG. 3 to result in a region 211A of FIG. 4. Region 211 shows the description of "0000" indicating a state where an account code is not yet set. Region 211A shows the description of data "3260", "4480" and "1100", attaining the state where respective data are set.

Region 212 of FIG. 3 is where information related to a password (password code) is written. Based on the information in this region 212, option 203A corresponding to set section 201A of the password is displayed in print setting screen 200. After the data of the option of the unique information is edited, information is written into region 212 of FIG. 3 to result in region 212A of FIG. 4. Region 212 shows the description of "******" indicating that a password is not yet set. Region 312A shows the description of data "1234", "2020" and "5533", attaining the state where respective data are set.

Region 213 of FIG. 3 is where information related to a user's name (user name) is written. Based on the information in region 213, option 203B corresponding to set section 201B of the user name is displayed on print setting screen 200. After the data of the option of the unique information is edited, information is written into region 213 of FIG. 3 to result in region 213A of FIG. 4. Region 213 shows the description of "none" indicating the state where a user name is not yet set. Region 123A shows the description of user name data "Nakao", attaining a state where that user name data is set.

Region 214 of FIG. 3 is where information related to the overlay form (Overlay) is written. Based on the information in this region 214, option 203C corresponding to set section 201C of the overlay form is displayed on print setting screen 200. After the data of the option of the unique information is edited, information is written into region 214 of FIG. 3 to result in region 214A of FIG. 4. Region 214 shows the description of "NO FORM" indicating that no overlay form is set. Region 214A shows the description of data "FORM 1", "FORM 2", "FORM 3", "FORM 4" and "FORM 5", attaining a state where respective data are set.

Figure 5:
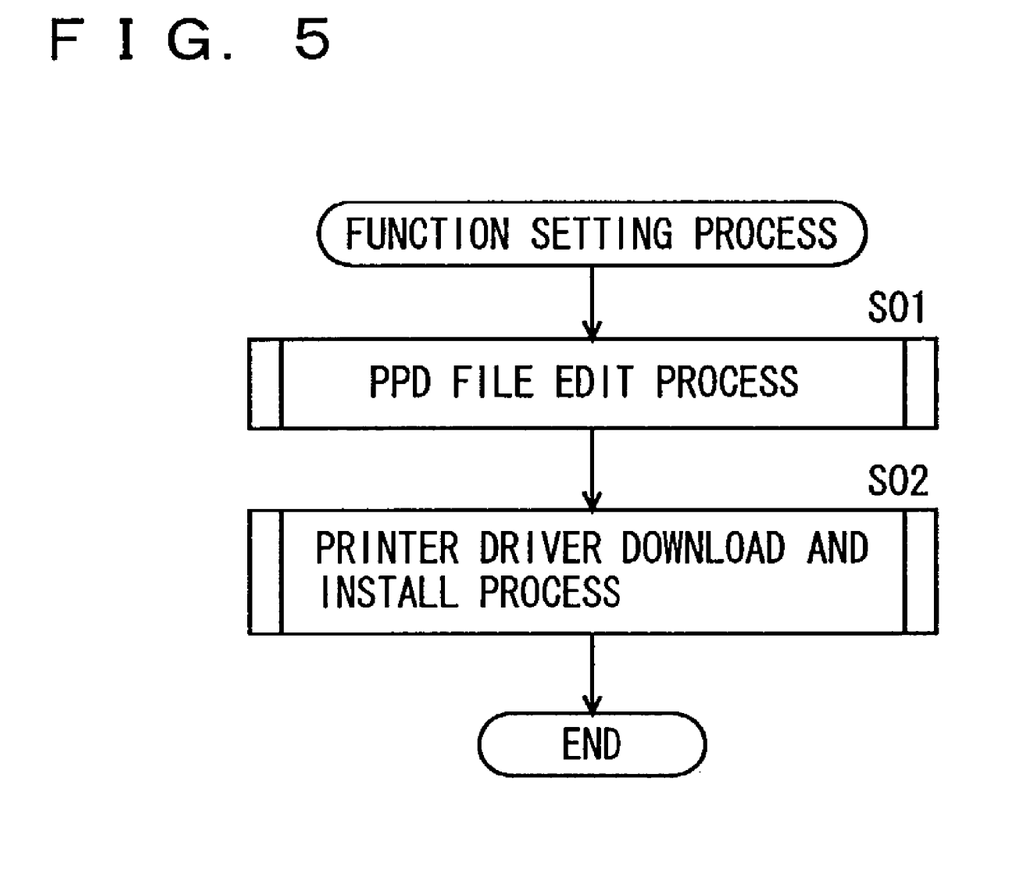
FIG. 5 is a flow chart of a printer function setting process executed at a client PC according to an embodiment.

FIG. 5 is a flow chart of a printer function setting process executed by a client PC of the present embodiment. Referring to FIG. 5, client PC 110 executes a PPD file edit process (step S01), and then a process to download a printer driver program and install the downloaded printer driver program (step S02).

In printer system 100 of the present embodiment, server PC 120 functions as a Web server. By the execution of Browser software at the client PC, a server client system is established allowing communication between client PC 110 and server PC 120.

Figure 6:
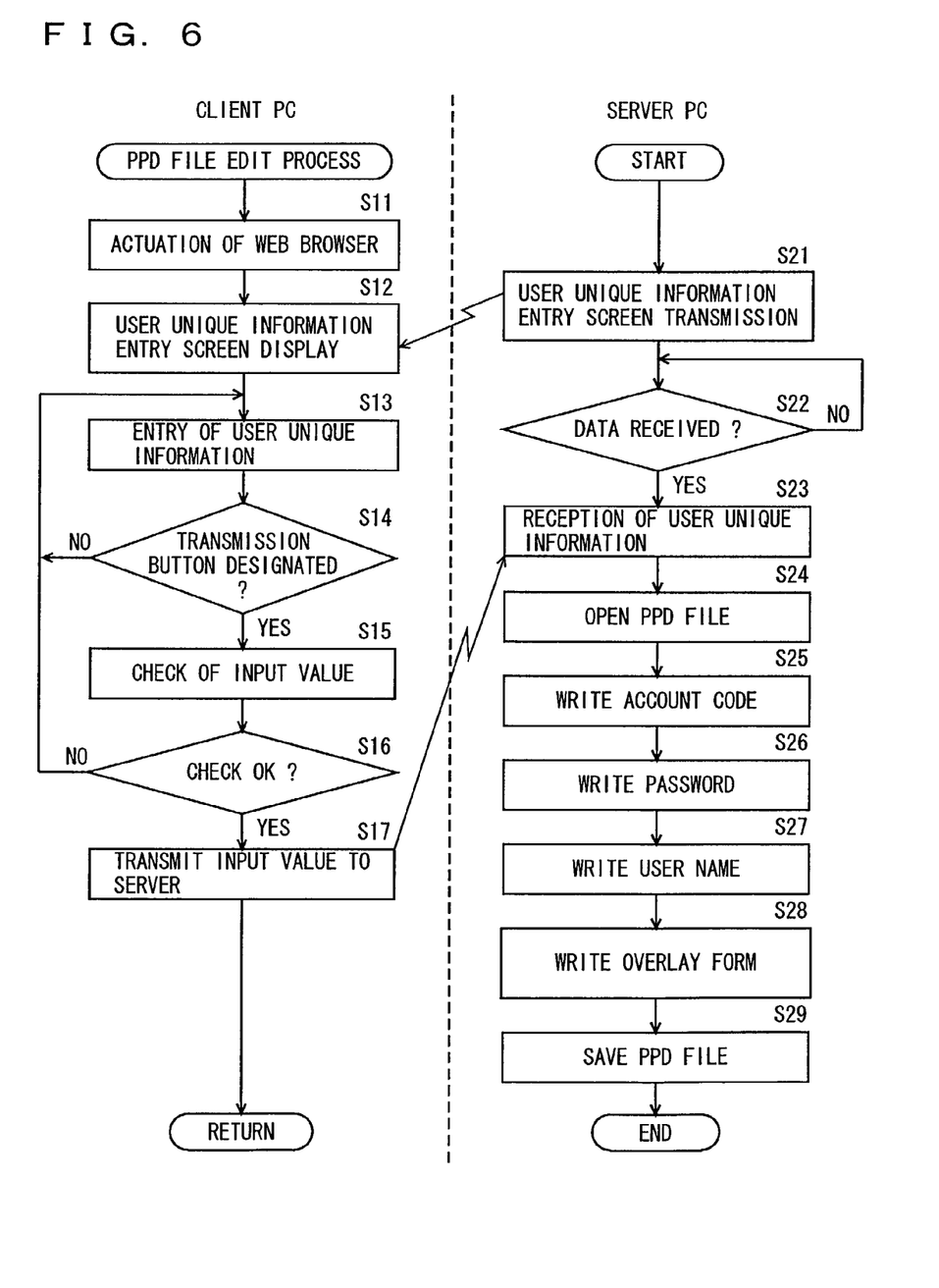
FIG. 6 is a flow chart of a PPD file edit process executed at the printer system according to an embodiment.

FIG. 6 is a flow chart of a PPD file edit process executed at the printer system of the present embodiment. The PPD file edit process is executed at both client PC 110 and server PC 120. For the sake of description, the process executed at client PC 110 and the process executed at server PC 120 are indicated in parallel in FIG. 6. The PPD file edit process executed at client PC 110 shown in FIG. 6 corresponds to the process executed at step S01 of FIG. 5. Referring to FIG. 6, client PC 110 has the Web browser actuated (step S11). Actuation of a Web Browser corresponds to execution of the broadly-used Web Browser software at client PC 110.

Then, a user unique information entry screen appears on the display of client PC 110 by the actuated Web Browser (step S12). The user unique information entry screen is a screen to enter the user's unique information to be written into the PPD file. This user unique information entry screen is displayed based on an HTML (Hypertext Markup Language) file prestored in a storage apparatus such as a hard disk in server PC 120. In response to a request from client PC 110, the HTML file is read out from the storage apparatus to be transmitted to client PC 110 (step S21). The HTML file transmission request from client PC 110 to server PC 120 is effected by the transmission of a URL (Uniform Resource Locators) which is a file pass to the HTML file where the description is provided to display a user unique information entry screen to server PC 120 from client PC 110.

The user of client PC 110 is now allowed to enter his/her own unique information according to the user unique information entry screen on the display. Entry of unique information is accepted (step S13). Entry of user unique information will be described hereinafter.

Figure 7:
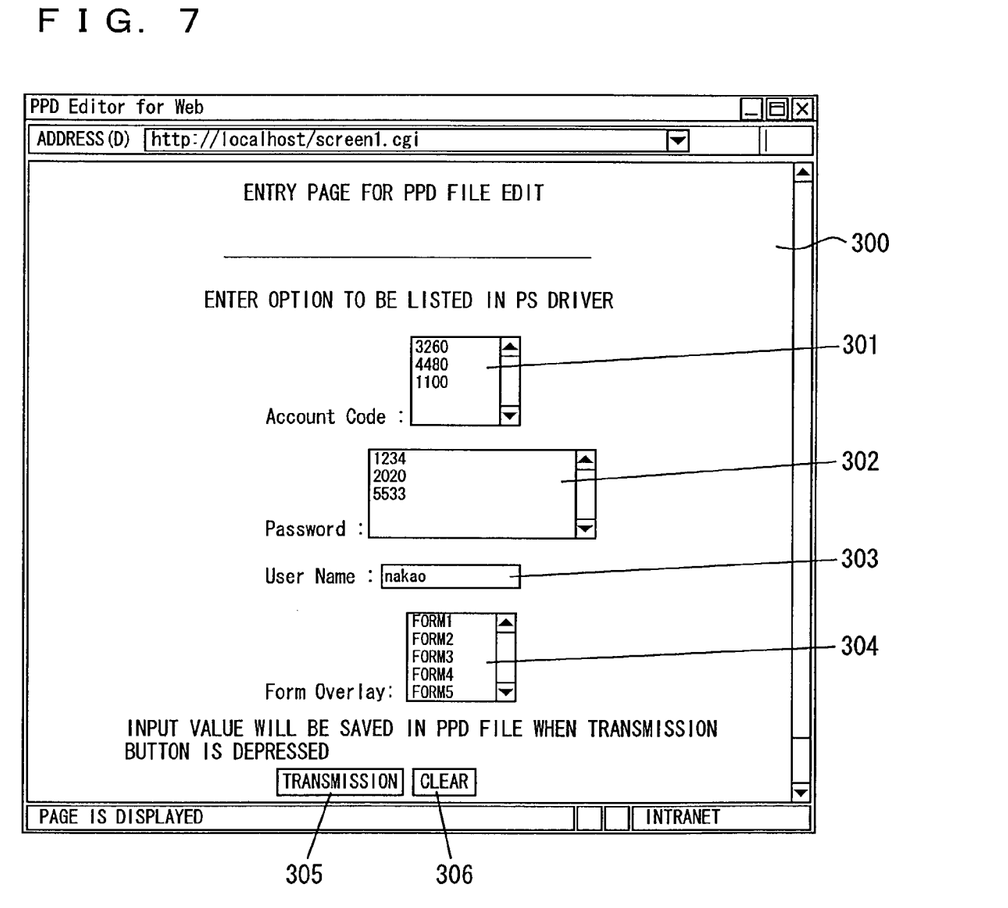
FIG. 7 shows a user unique information entry screen displayed at a client PC according to an embodiment.

FIG. 7 shows a user unique information entry screen displayed at client PC 110 of the present embodiment. User unique information entry screen 300 is provided on the display when the Web Browser executed at client PC 110 interprets the HTML file received from server PC 120. User unique information entry screen 300 includes an entry box 301 to enter data to be displayed as an option of the account code, an entry box 302 to enter data to be displayed as the option of a password, an entry box 303 to enter data to be displayed as the option of a user name, and an entry box 304 to enter data to be displayed as option of an overlay form. User unique information entry screen 300 also includes a transmission button 305 to designate transmission of the entered data to server PC 120, and a clear button 306 to clear all the input data and return to the default state.

Data entry to a specified entry box is allowed by the user specifying any of the entry boxes through the mouse or keyboard in the state where user unique information entry screen 300 is displayed on the display of client PC 110. For example, by moving the mouse pointer to entry box 301 and clicking the mouse, an account code can be entered at entry box 301. A plurality of data (a plurality of sets of characters) can be entered into each entry box. FIG. 7 corresponds to the case where the three account codes of 3260, 4480 and 1100 are entered at entry box 301; the three passwords of 1234, 2020 and 5533 are entered at entry box 302; one user name of "Nakao" is entered at entry box 303; and the five overlay forms of "FORM 1", "FORM 2", "FORM 3", "FORM 4" and "FORM 5" are entered at entry box 304.

Upon designating transmission button 305 through a mouse or keyboard after data entry into each of entry boxes 301-304, the entered data is transmitted to server PC 120. When clear button 306 is designated through the mouse or keyboard, the entered data is canceled and the data in each entry item returns to default. Here, the default data is "OFF" for the account code, and "no data" for the password, user name, and overlay form. In the HTML file from server PC 120 are written a command (instruction) to transmit the entered data to server PC 120 upon designation of transmission button 305 through the mouse or keyboard, and also a command to cancel the input data and return the data in each input item to the default upon designation of clear button 306.

Referring to the flow chart of FIG. 6 again, unique information entry is accepted (step S13), and then determination is made whether transmission button 305 is designated or not (step S14). Step S13 is executed for the entry of user's unique information until transmission button 305 is designated. When determination is made of designation of transmission button 305, the input value is then checked (step S15). A command for checking is defined in the HTML file received from server PC 120 at step S12. The input value is checked according to this command. Such a command is defined for each entry box for the purpose of checking the type of input data (text or numeral) as well as the number of characters or number of digits. For example, the command directed to entry box 301 corresponding to the account code checks whether the type of the input data is text and whether there are 4 characters.

Then, determination is made of the result of the check carried out at step S15 (step S16). When determination is made that the check result is proper, control proceeds to step S17, otherwise, returns to step S13 to prompt the user to enter data again. At step S17, the input data is transmitted to server PC 120.

In the present embodiment, checking of the data entered into each entry box in user unique information entry screen 300 is executed at client PC 110. This check can be executed at server PC 120. In this case, the user enters data in the entry box and designates transmission button 305 through the mouse or keyboard, whereby the input data is transmitted to server PC 120. On the part of server PC 120, the received data is checked. The result of checking carried out by server PC 120 is transmitted to client PC 110. When the check result indicates that data has not been properly entered, user unique information entry screen 300 is displayed again at client PC 110 to prompt the user to enter data.

Server PC 120 attains a standby state until the data entered at an entry box is transmitted (step S22). Upon transmission of data, control proceeds to step S23. In practice, interruption occurs according to data reception, whereby control proceeds to step S23.

At step S23, user unique information entered according to user unique information entry screen 300 is received from client PC 110. Then, the PPD file is read in (step S24). The PPD file read in here is a PPD file corresponding to the HTML file transmitted at step S21. In other words, the HTML file and PPD file form a pair. For example, the companion PPD file name is defined in the HTML file. Also, the names of the HTML file and PPD file can be selected to be partially identical, and provide definition of a pair corresponding to each other. Here, it is assumed that the PPD file of FIG. 3 is read in at step S23.

At step S25, the data of the account code among the user unique information received at step S23 is written into region 211 that defines the account code of the PPD file. The writing format is determined in advance. The received data is written according to the predetermined format. For example, when the data of 3260, 4480 and 1100 are received and written as the account code of the user unique information, region 211 of FIG. 3 is rewritten as region 211A of FIG. 4.

At step S26, the password data among the user unique information received at step S23 is written into region 212 that defines the password of the PPD file. For example, when the password data of 1234, 2020 and 5533 of the user unique information are received and written, region 212 of FIG. 3 is rewritten as region 212A of FIG. 4.

At step S27, the user name data among the user unique information received at step S23 is written into region 213 defining the user name of the PPD file (e.g., a user name is assigned to the PPD file). For example, when the user name data of "Nakao" is received and written as the user unique information, region 213 of FIG. 3 is rewritten as region 213A of FIG. 4.

At step S28, the overlay form data among the user unique information received at step S23 is written into region 214 defining the overlay form of the PPD file. For example, when overlay form data of "FORM 1", "FORM 2", "FORM 3" "FORM 4" and "FORM 5" are received and written, region 214 of FIG. 3 is rewritten as region 214A of FIG. 4.

At step S29, the PPD file into which user's unique information is written is saved. In this saving operation, the user name becomes the file name of the PPD file. Accordingly, a PPD file unique to each user will be saved. The PPD file is stored in a predetermined location in the storage apparatus of server PC 120 to facilitate specification by the user in a download operation. The PPD file does not have to be a file unique to a user, and may be an exclusive file corresponding to the printer driver program file. In this case, the printer driver program file and PPD file are set in one-to-one correspondence. Therefore, in the printer driver program download operation that will be described afterwards, only the printer driver program file, not the PPD file, has to be specified. Furthermore, in the case where the printer driver program file is determined based on designation of a printer, only the printer has to be specified. It is not necessary to specify the PPD file.

The download process and install process of a printer driver program at client PC 110 will be described hereinafter. The printer driver program download process and install process are functions included in the operating system loaded on client PC 110. Therefore, the printer driver download process and install process differ depending upon the operating system mounted on client PC 110. Here, description is provided based on a typical example.

Figure 8:
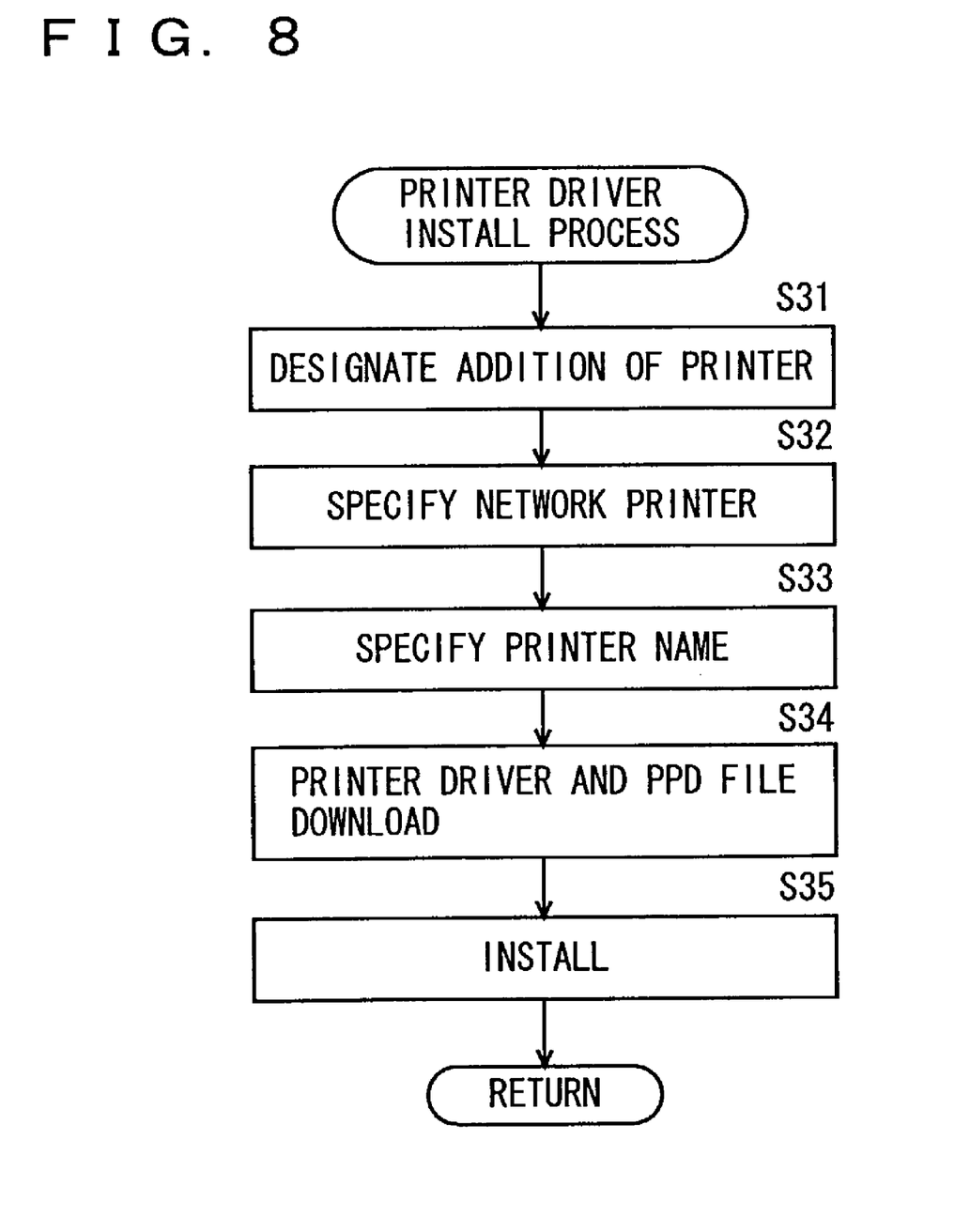
FIG. 8 is a flow chart of a printer driver install process executed at the printer system of an embodiment.

FIG. 8 is a flow chart of a printer driver install process executed at the printer system of the present embodiment. FIG. 8 represents only the process executed at client PC 110, and corresponds to the process executed at step S02 of FIG. 5. FIGS. 9A, 9B, 9C, 10A and 10B show examples of a screen displayed at client PC 110 where the printer driver install process of FIG. 8 is executed.

Figure 9A:
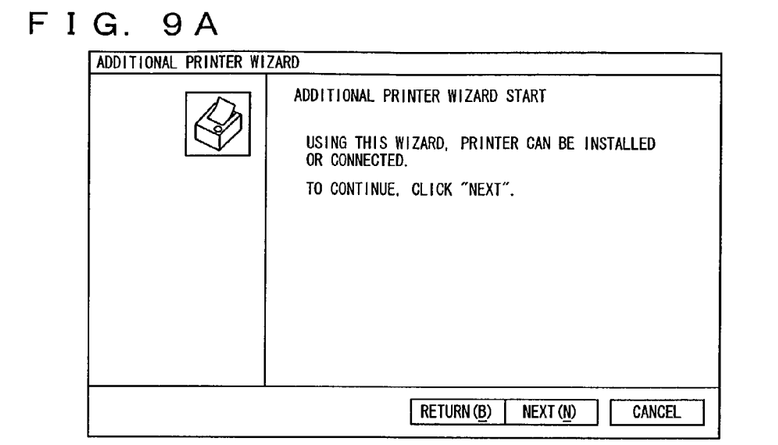
FIGS. 9A, 9B, 9C, 10A and 10B show examples of a screen displayed at a client PC where the printer driver install process of FIG. 8 is executed.
Figure 9B:
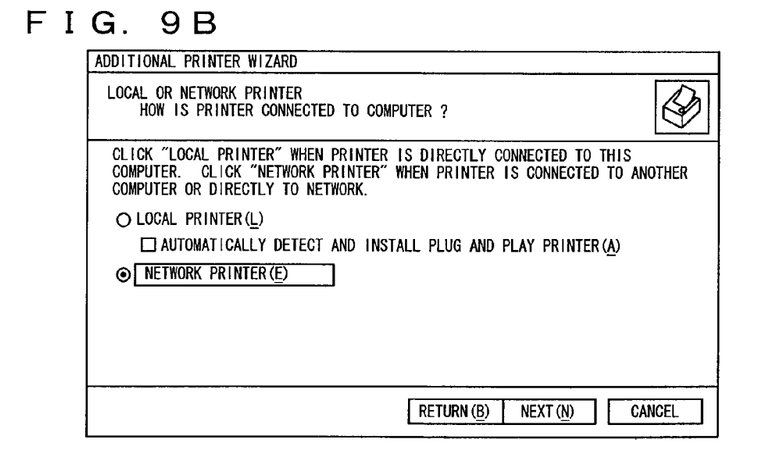

Referring to FIGS. 8, 9A, 9B, 9C, 10A and 10B, the user of client PC 110 operates the mouse to double-click the "additional printer" icon in the printer folder, whereby the additional printer wizard program of the operating system is executed (step S31). Accordingly, the screen of FIG. 9A is displayed. When the user designates the "next" button on the displayed screen, the screen of FIG. 9B is displayed.

FIG. 9B shows a screen to designate the printer type. There is a "local printer" and a "network printer" for the printer type. In the present embodiment, the type of printer 130 is a network printer, as described with reference to FIG. 1. Therefore, the user will designate the radio button of the network printer (step S32).

Figure 9C:
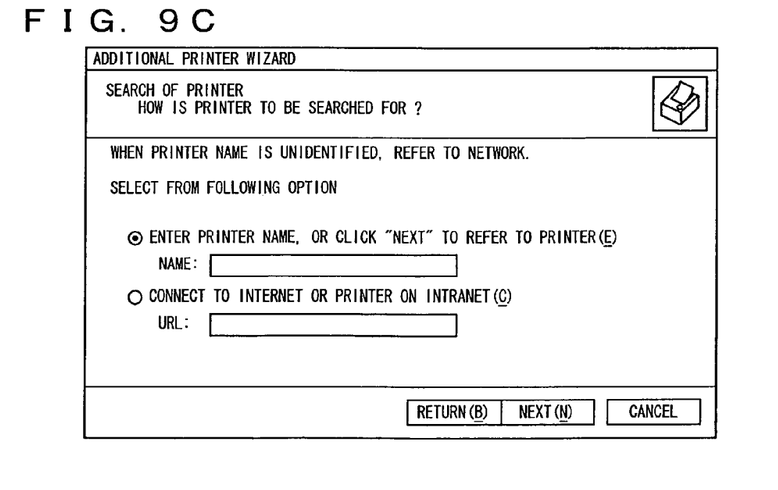
Figure 10A:
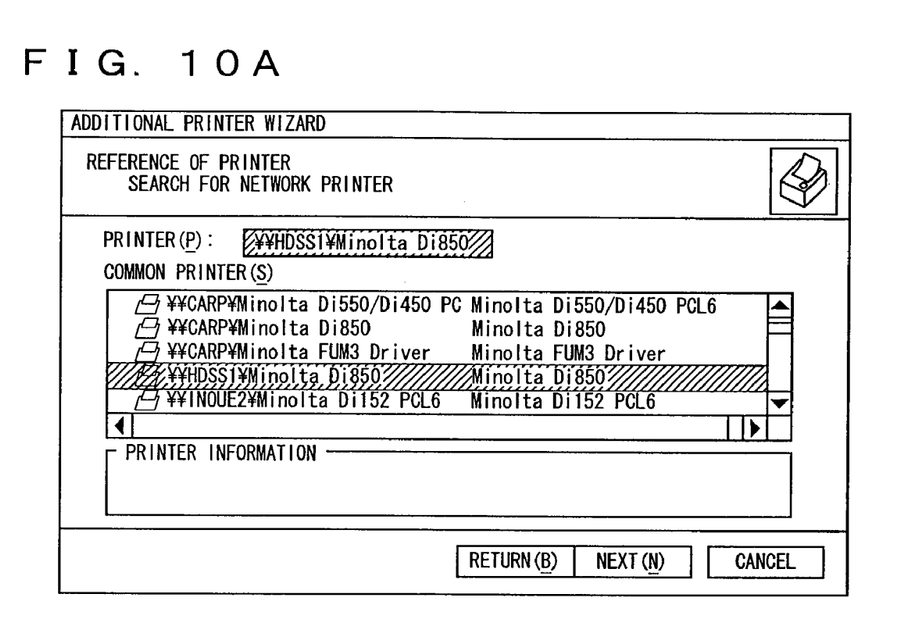

Then, the process of designating the printer is executed (step S33). When the user designates the "next" button on the screen of FIG. 9B, the screen to specify the printer as shown in FIG. 9C appears. Here, the name preassigned to the printer is entered in the section where the name is to be entered using the keyboard or the like. Alternatively, the "next" button is designated. When the "next" button is designated without entering a printer's name in the section where the name of the printer is to be entered, a screen to specify the printer's name as shown in FIG. 10A appears. When the printer's name is entered in the section where the name of the printer is to be input and the "next" button is designated, control proceeds to step S34.

On the screen of FIG. 10A, a list of names of printers that can be connected to client PC 110 is displayed. The user can select a desired printer from the displayed list. By selecting the printer that is the install subject of the driver software and designating the "next" button, control proceeds to step S34.

At step S34, the printer driver program of the printer specified at step S33 and also the PPD file corresponding to that printer driver and edited at the above-described PPD file edit process are downloaded. The present example corresponds to the case where a printer driver program and a PPD file corresponding to that printer driver program are determined by specifying a printer. In the case where a PPD file is saved for each user as mentioned above, the appropriate PPD file cannot be determined by just specifying a printer. A PPD file must be specified together with the specification of a printer. A screen to specify a PPD file is not exemplified here. It is understood that one skilled in the art can readily specify a PPD file using an appropriate screen.

Figure 10B:
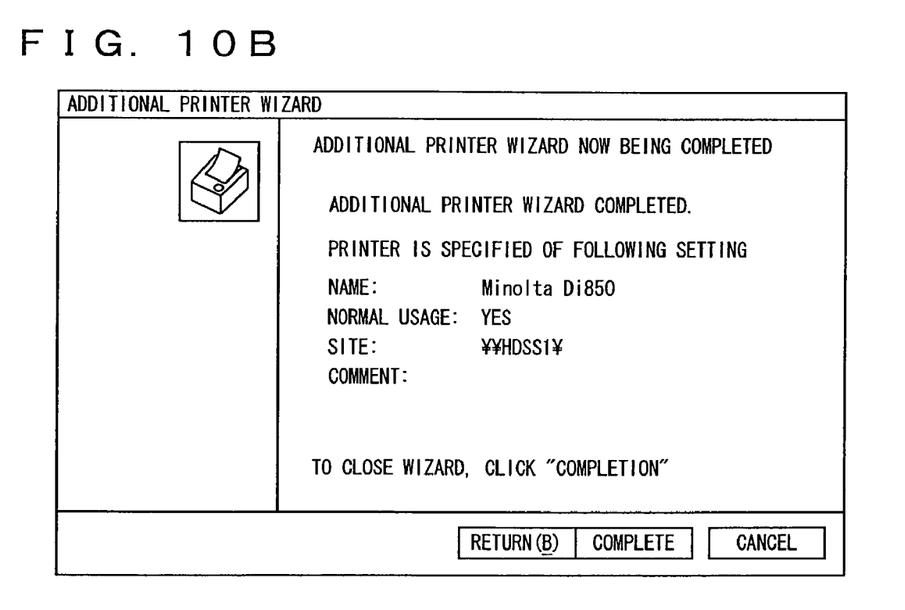

Using the down-loaded printer driver program and PPD file, the printer driver is installed in client PC 110 (step S35). Upon completion of install, the screen of FIG. 10B is displayed. By specifying the "completion" button, the process ends.

In the above-described printer system of the present embodiment, the PPD file of printer 130 stored in server PC 120 can be edited by the user of client PC 110. Therefore, information unique to the user of client PC 110 can be written into a PPD file. As a result, a PPD file differing for each client PC 110 can be downloaded. A printer driver that reflects the user's unique information can be installed.

Since user's unique information is written in the PPD file, the user's unique information can be displayed at the option box of each item on print setting screen 200 at client PC 110 that is displayed in the printing operation. By providing a PPD file differing for each user, the unique information of other users will not be displayed at the option box of each item on the print setting screen.

Second Embodiment

The previous first embodiment corresponds to the case where a PPD file is edited at client PC 110. In the printer system of the second embodiment, printer 130 is a local printer, directly connected to the computer. This corresponds to the connecting relationship between server PC 120 and printer 130 shown in FIG. 1B.

Figure 11:
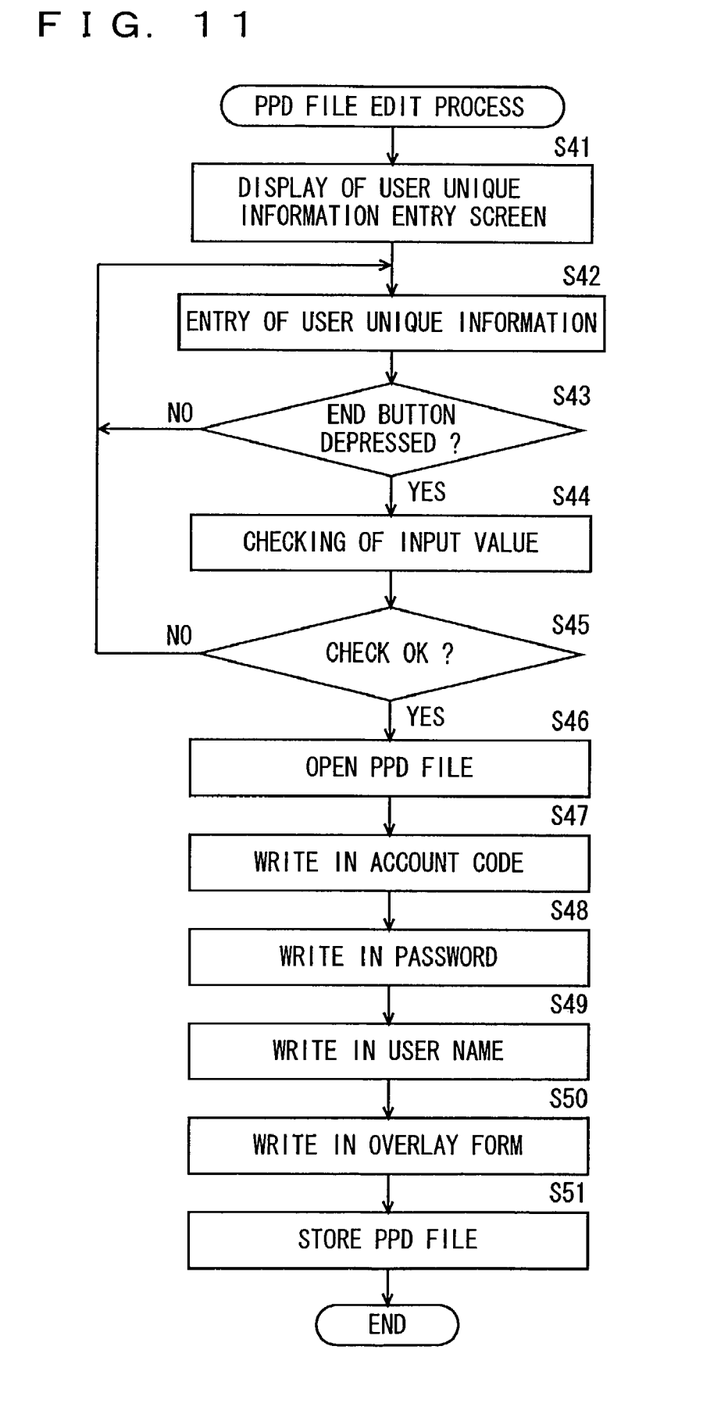
FIG. 11 is a flow chart of a PPD file edit process executed at a server PC of the printer system according to a second embodiment.

Therefore, the process of editing a PPD file is executed at server PC 120. FIG. 11 is a flow chart of the PPD file edit process executed at server PC 120 in the printer system of the second embodiment. Referring to FIG. 11, upon execution of a PPD file edit program at server PC 120, a user unique information entry screen 300 for the user to enter unique information that is to be written in a PPD file is provided on the display (step S41). Server PC 120 includes a storage apparatus such as a hard disk. The PPD file edit program is prestored in this storage apparatus. When this PPD file edit program is read out and executed at server PC 120, user unique information entry screen 300 of FIG. 7 appears on the display of server PC 120. It is to be noted that user information entry screen 300 displayed at server PC 120 differs from user information entry screen 300 of FIG. 7 in that "transmission" button 305 is replaced with "end" button.

The user of server PC 120 is now allowed to enter unique information according to user unique information entry screen 300 on the display. Entry of unique information is accepted (step S42). The acceptance of unique information entry at step S42 is similar to the acceptance of specific information entry at client PC 110 described in the previous first embodiment. Therefore, description thereof will not be repeated.

Following acceptance of unique information entry, determination is made whether the end button has been designated or not (step S43). Step S42 is executed for the input of user's unique information until the end button is designated. When determination is made that the end button has been designated, the input value is checked (step S44). For the purpose of checking the input value, a command for checking is written in the HTML file read out at step S41. The input values are checked according to this command.

Determination is made of the result of checking carried out at step S44 (step S45). When determination is made that the checking result is proper, control proceeds to step S46, otherwise, returns to step S42 to prompt the user to enter data again.

At step S46, a PPD file is read in. The PPD file read in here is a PPD file corresponding to the HTML file read out at step S41.

At step S47, the data of the account code among the user unique information received at step S42 is written into region 211 that defines the account code of the PPD file. The writing format is determined in advance. The received data is written according to the predetermined format. For example, when the data of 3260, 4480 and 1100 are received and written as the account code of the user unique information, region 211 of FIG. 3 is rewritten as region 211A of FIG. 4.

At step S48, the password data among the user unique information received at step S42 is written into region 212 that defines the password of the PPD file. For example, when the password data of 1234, 2020 and 5533 of the user unique information are received and written, region 212 of FIG. 3 is rewritten as region 212A of FIG. 4.

At step S49, the user name data among the user unique information received at step S42 is written into region 213 defining the user name of the PPD file. For example, when the user name data of "Nakao" is received and written as the user unique information, region 213 of FIG. 3 is rewritten as region 213A of FIG. 4.

At step S50, the overlay form data among the user unique information received at step S42 is written into region 214 defining the overlay form of the PPD file. For example, when overlay form data of "FORM 1", "FORM 2", "FORM 3" "FORM 4" and "FORM 5" are received and written, region 214 of FIG. 3 is rewritten as region 214A of FIG. 4.

At step S51, the PPD file into which user's unique information is written is saved. In this saving operation, the user name becomes the file name of the PPD file. Accordingly, a PPD file unique to each user will be saved. The PPD file is stored in a predetermined location in the storage apparatus of server PC 120 to allow the user to indicate the printer driver of printer 130 in an install operation. The PPD file does not have to be a file unique to a user, and may be an exclusive file corresponding to the printer driver program file. In this case, the printer driver program file and PPD file are set in one-to-one correspondence. Therefore, in the printer driver install operation, only the printer driver program file, not the PPD file, has to be specified. Furthermore, in the case where the printer driver program file is determined based on designation of a printer, only the printer has to be specified. It is not necessary to specify the PPD file.

In the printer system of the second embodiment, information input using the Web Browser at server PC 120 is written into a PPD file. Therefore, a PPD file can be edited readily.

Since the information entered using the Web Browser is user's unique information, the user's unique information can be included in the PPD file.

The PPD file edit process of a printer shown here is directed to a process to edit a PPD file. Since the function of a printer is determined based on the edited PPD file, it can be said that the process corresponds to a process to set the function of a printer. This printer function setting process can be realized by causing a computer to execute the printer function setting program to implement the above-described series of processing operation. The printer function setting program may be preinstalled in a hard disk in the computer, or may be recorded into a detachable recording medium such as CD-ROM or a magnetic tape. In any event, the printer function setting program is recorded into a computer-readable recording medium.

In general, such software is stored in a recording medium such as a CD-ROM or FD to be distributed, and then read out from the recording medium by a CD-ROM drive or FD drive of the computer to be temporarily stored in the hard disk incorporated in the computer. Then, the software is read out from the hard disk into a RAM to be executed by a CPU.

The term "program" as used herein includes, not only a program that can be executed directly by a CPU, but a program in a source program format, compressed program, encrypted program, and the like.

The computer-readable recording medium is not limited to a CD-ROM, a FD and a hard disk, and includes a magnetic tape, a cassette tape, an optical disc MO (Magnetic Optical Disc)/MD (Mini Disc)/DVD (Digital Versatile Disc)), an IC card (including memory card), an optical card, or a medium that retains a program in a non-volatile manner such as a semiconductor memory, for example, a mask ROM, EPROM, EEPROM, or a flash ROM.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer-readable medium having a computer program product stored thereon and executed in a server computer connected to a printer and a client computer, said computer program product comprising computer instructions for causing the server computer to execute operations comprising:
    transmitting, to the client computer, data for displaying a screen on the client computer for prompting characters to be inputted on the client computer; and
    editing a printer function description file, in which a function of the printer is described, based on the characters inputted on the client computer when the inputted characters are transmitted from the client computer to the server computer.

2. A computer-readable medium as claimed in claim 1, wherein the data transmitted to the client computer is an HTML file.

3. A computer-readable medium as claimed in claim 1, wherein the printer function description file is used by a printer driver to display the inputted characters as one of selectable options for a user.

4. A computer-readable medium as claimed in claim 1, wherein said editing operation comprises adding the inputted characters into a predetermined location in the printer function description file.

5. A computer-readable medium as claimed in claim 1, further comprising an operation of saving the printer function description file for every user who inputs characters on the client computer.

6. A computer-readable medium as claimed in claim 1, wherein the printer function description file is a PostScript printer description (PPD) file used by a PostScript printer driver.

7. A computer-readable medium as claimed in claim 1, wherein the characters include at least one of an account code, a password, and a user name.

8. A computer-readable medium as claimed in claim 1, wherein the prompting screen accepts a plurality of sets of characters with respect to one item.

9. A computer-readable medium as claimed in claim 1, wherein:
    the characters inputted on the client computer by the user represent information which is unique to the user; and
    said editing operation comprises editing the printer description file based on the characters transmitted from the client computer to define a function of the printer to operate in accordance with the unique information of the user.

10. A printer function description file editing method carried out in a system including a server computer, a client computer and a printer connected with each other, said method comprising steps of:
    at the server computer, transmitting data to the client computer for displaying a screen on the client computer for prompting characters to be inputted;
    at the client computer, displaying the screen based on the data transmitted from the server computer and transmitting the inputted characters to the server computer; and
    at the server computer, editing a printer function description file, in which a function of the printer is described, based on the characters transmitted from the client computer.

11. A computer-readable medium having a computer program product stored thereon and executed in a computer connected to a printer, said computer program product comprising computer instructions for causing the computer to execute operations comprising:
    displaying an input box for inputting characters, wherein said characters are displayed by a printer driver as one of selectable options for a user to input information unique to the user; and
    writing the inputted characters into a printer function description file, which defines a function of the printer, to edit the printer function description file and cause the printer to operate in accordance with the unique information of the user.

12. A computer-readable medium as claimed in claim 11, wherein the printer function description file is a PostScript printer description (PPD) file used by a PostScript printer driver.

13. A computer-readable medium as claimed in claim 11, wherein the characters include at least one of an account code, a password, and a user name.

14. A computer-readable medium as claimed in claim 11, wherein the input box accepts a plurality of sets of characters with respect to one item.

15. A printer function description file editing method as claimed in claim 10, wherein:
    the characters inputted on the client computer by the user represent information which is unique to the user; and
    said editing step comprises editing the printer description file based on the characters transmitted from the client computer to define a function of the printer to operate in accordance with the unique information of the user.

16. A printer function description file editing method as claimed in claim 10, wherein the data transmitted to the client computer is an HTML file.

17. A printer function description file editing method as claimed in claim 10, wherein the printer function description file is used by a printer driver to display the inputted characters as one of selectable options for a user.

18. A printer function description file editing method as claimed in claim 10, wherein the editing step comprises adding the inputted characters into a predetermined location in the printer function description file.

19. A printer function description file editing method as claimed in claim 10, further comprising a step of saving the printer function description file for every user who inputs characters on the client computer.

20. A printer function description file editing method as claimed in claim 10, wherein the printer function description file is a PostScript printer description (PPD) file used by a PostScript printer driver.

21. A printer function description file editing method as claimed in claim 10, wherein the characters include at least one of an account code, a password, and a user name.

22. A printer function description file editing method as claimed in claim 10, wherein the prompting screen accepts a plurality of sets of characters with respect to one item.

23. A computer-readable medium as claimed in claim 1, wherein said computer program product further causes the server computer to execute an operation of transmitting the edited printer description file to the client computer for updating a printer driver of the client computer based on the edited printer description file.

24. A printer function description file editing method as claimed in claim 10, further comprising the steps of:
- at the server computer, transmitting the edited printer description file to the client computer; and
- at the client computer, receiving the edited printer description file and updating a printer driver of the client computer based on the edited printer description file.

* * * * *